United States Patent
Debie

(10) Patent No.: US 11,167,722 B2
(45) Date of Patent: Nov. 9, 2021

(54) SYSTEM AND METHOD FOR CHECKING THE REAR SEAT BELT STATUS IN A VEHICLE

(71) Applicant: TOYOTA MOTOR EUROPE, Brussels (BE)

(72) Inventor: Bert Debie, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 0 days.

(21) Appl. No.: 16/968,385

(22) PCT Filed: Feb. 28, 2018

(86) PCT No.: PCT/EP2018/054967
§ 371 (c)(1),
(2) Date: Aug. 7, 2020

(87) PCT Pub. No.: WO2019/166086
PCT Pub. Date: Sep. 6, 2019

(65) Prior Publication Data
US 2020/0391694 A1 Dec. 17, 2020

(51) Int. Cl.
*B60Q 1/00* (2006.01)
*B60R 22/48* (2006.01)

(52) U.S. Cl.
CPC ...... *B60R 22/48* (2013.01); *B60R 2022/4866* (2013.01)

(58) Field of Classification Search
None
See application file for complete search history.

(56) References Cited

U.S. PATENT DOCUMENTS

| | | | |
|---|---|---|---|
| 6,362,734 B1 | 3/2002 | McQuade et al. | |
| 7,173,522 B2* | 2/2007 | Inoue | B60R 22/48 340/457 |
| 2004/0178901 A1* | 9/2004 | Ota | B62D 1/046 340/457.1 |
| 2005/0156726 A1* | 7/2005 | Rubel | B60R 22/48 340/457.1 |
| 2010/0283593 A1 | 11/2010 | Miller et al. | |

(Continued)

FOREIGN PATENT DOCUMENTS

ER 2 905 173 A1 8/2015

OTHER PUBLICATIONS

International Search Report for PCT/EP2018/054967 dated Jul. 23, 2018 [PCT/ISA/210].

(Continued)

*Primary Examiner* — Brent Swarthout
(74) *Attorney, Agent, or Firm* — Sughrue Mion, PLLC

(57) ABSTRACT

A system, vehicle and method for checking a rear seat belt status in a vehicle having a passenger cabin with at least one rear seat including an ambient light source configured to be arranged in the passenger cabin, an electronic control device configured to check whether the following conditions are fulfilled:
(1) at least one rear seat is occupied,
(2) the rear seat belt of the least one occupied rear seat is not buckled,
in case each of the conditions is fulfilled, output a seat belt warning by activating the ambient light source using a predetermined lighting pattern.

15 Claims, 1 Drawing Sheet

(56) References Cited

U.S. PATENT DOCUMENTS

| | | | | |
|---|---|---|---|---|
| 2012/0194377 A1* | 8/2012 | Yukumatsu | ............... | G01S 7/35 |
| | | | | 342/70 |
| 2013/0214919 A1* | 8/2013 | Bassali | .................. | B60R 22/48 |
| | | | | 340/457.1 |
| 2015/0130605 A1* | 5/2015 | Helm | .................. | B60N 2/2812 |
| | | | | 340/457.1 |
| 2015/0329041 A1 | 11/2015 | Salter et al. | | |
| 2018/0208153 A1* | 7/2018 | Shiozawa | ................ | G06K 9/78 |

OTHER PUBLICATIONS

Written Opinion for PCT/EP2018/054967 dated Jul. 23, 2018 [PCT/ISA/237].

* cited by examiner

US 11,167,722 B2

SYSTEM AND METHOD FOR CHECKING THE REAR SEAT BELT STATUS IN A VEHICLE

CROSS REFERENCE TO RELATED APPLICATIONS

This application is a National Stage of International Application No. PCT/EP2018/054967 filed Feb. 28, 2018.

FIELD OF THE DISCLOSURE

The present disclosure is related to a system, a vehicle, and a method for checking a rear seat belt status in the vehicle, and in particular to inform the vehicle passengers about the rear seat belt status.

BACKGROUND OF THE DISCLOSURE

Conventional vehicles comprise a passenger cabin where the driver is seated in the front and there may be at least one, usually three back seats. For safety reasons, it is important that each of the vehicle passengers is secured by a buckled (i.e. fastened) seat belt.

Several systems are known for checking the seat belt status and informing the passengers, in particular the driver about said status. A common one is outputting a sound, in case it has been determined by the system that the driver has not fastened his or her seat belt. Furthermore, the driver's control panel (i.e. the dashboard) may be provided with a warning light which warns the driver, in case a passenger has not buckled his/her seat belt.

WO2013191348 (A1) discloses a safety belt device having an LED lighting function configured such that an LED installed in the safety belt can be controlled to be turned on or turned off according to the fastened or unfastened state of the safety belt.

WO9217731 (A1) describes a vehicle occupant restraint belt buckle for detachably securing a keeper to secure a belt portion as including a hollow housing including a translucent portion and receiving a latch member that is moved between latched and unlatched positions to detachably secure the keeper. An electrically energized light source is mounted within the housing to provide illumination through the translucent portion. A switch is also preferably incorporated into the buckle and controls light source energization in response to the secured or detached condition of the keeper by the latch member.

However, there is the problem that known lighting techniques are not suitable to inform the passengers, in particular including the vehicle driver about the rear seat belt status in an appropriate way. In this regard it is notable that the driver has difficulties to check whether the spot-like light sources of the seat belts in the known systems are activated or not. This is regularly only possible by looking over his/her shoulder straight to the back, what's though hardly possible once the vehicle is already moving. Such a check is anyway often necessary, as the back seats are regularly occupied by children who require an additional control by the driver. Meanwhile, the use of a warning light at the driver's control panel (i.e. the dashboard) has the disadvantage that said light is usually only visible to the driver but not to a passenger on a rear seat. Further, even the driver may overlook said warning light or may not easily understand its meaning (i.e. assign it to a specific rear seat belt), due to the fact that it is only one relatively small spot-like light source among a multitude of information and warning lights/indications at the driver's control panel.

SUMMARY OF THE DISCLOSURE

Currently, it remains desirable to provide a system and a method of checking a rear seat belt status in the vehicle which is able to inform the vehicle passengers, in particular including the vehicle driver about the rear seat belt status in an appropriate way.

Therefore, according to the embodiments of the present disclosure, a system for checking a rear seat belt status in a vehicle is provided. The vehicle has a passenger cabin with at least one rear seat. The system comprises:
  an ambient light source configured to be arranged in the passenger cabin,
  an electronic control device configured to:
    check whether the following conditions are fulfilled:
      (1) at least one rear seats is occupied,
      (2) the rear seat belt of the least one occupied rear seat is not buckled (i.e. fastened /closed),
    in case each of the conditions is fulfilled, output a seat belt warning by activating the ambient light source using a predetermined lighting pattern.

By providing such a system, it becomes possible to signal to the vehicle passengers, including in particular also the vehicle driver that a passenger on a rear seat is not secured by his/her seat belt. Due to the use of the ambient light source, such signalling can be realized in an unintrusive manner which is anyway perceivable by any of vehicle passengers, including the vehicle driver. For example, the driver may remark such a signalling by looking to the rear view mirror and/or noticing the light reflection in the vehicle cabin, e.g. on the cabin roof or the rear windows. Accordingly, even if the driver looks over his/her shoulder to check the signalling, he/she can easily recognize the light reflections in the rear cabin and is not obliged to focus on one specific light spot.

Using the ambient light source has at least two advantages: First, vehicles are commonly equipped with ambient light sources. Hence, the system may use these already existing ambient light source(s) which can also be used for other purposes.

Second, the ambient light source creates an unintrusive but extensive light. This may be achieved by providing several light sources arranged on a surface and/or along a bar and/or as an LED arrays. An ambient light differs hence desirably from a single light spot.

Furthermore, the ambient light source may be arranged such that it creates only indirect light. In other words, the single light sources of the ambient light source (e.g. LEDs) may be arranged such that they are not visible to the vehicle passengers. Accordingly, only reflected (i.e. unintrusive) light becomes visible to the passengers.

For example the ambient light source may be arranged e.g. in the door trim.

The ambient light source may consist of a plurality of ambient light sources (or light source elements) arranged at different positions in the vehicle, e.g. in the vehicle doors.

The ambient light source may be arranged in the rear of the vehicle, in particular adjacent to the rear seats, e.g. in the vehicle rear doors. Thus e.g. it is possible to activate ambient light source adjacent to a rear seat to which the conditions of a seat belt warning applies, e.g. for the left seat the ambient light source on the left side (e.g. in the left door), for the right seat the ambient light source on the right side (e.g. in the right door), and/or for the center seat the ambient light source in the center (e.g. rear central console) or on the left and right side (e.g. in the left and right door).

Moreover, by using a predetermined lighting pattern it can be easily understood by the passengers that the system informs about seat belt status, i.e. that it outputs a seat belt warning.

The system may also be configured to check a front seat belt status, in the same manner as a rear seat belt status, and to output a seat belt warning for a front seat in the same manner as for a rear seat.

The electronic control device may further be configured to check whether the further condition is fulfilled: (3) the vehicle is driving.

Accordingly, desirably only when this additional condition is also fulfilled, the seat belt warning may be output by activating the ambient light source using the predetermined lighting pattern.

The condition whether the vehicle is driving may comprise the condition whether the vehicle is driving with at least a predetermined minimum speed (e.g. 1.5 or 1.75 km/h).

The condition whether the at least one rear seat is occupied may comprise the condition whether the at least one rear seat is occupied by an object having at least a predetermined minimum weight.

The ambient light source may be configured to be arranged in the rear of the vehicle cabin.

In particular, the ambient light source may be configured to be arranged in the rear door trim of the left and/or right rear door.

The ambient light source may be configured to be arranged in the rear door trim of the left and/or right rear door. For example, ambient light reflected by the vehicle passenger cabin may be visible to the driver, at least when he/she looks to the rear view mirror and/or turns his/her head.

The predetermined lighting pattern may comprise flashing (i.e. blinking) light with a predetermined frequency and/or a predetermined color. For example, the light may flash with a frequency of 0.5 Hz and/or may be red.

The electronic control device (1) may be further configured to:
receive an output of a blind spot monitor unit,
receive an output of a rear cross traffic alert unit, and/or
receive an output of a door open warning unit.
Hence, the control device may carry out further functions in the vehicle.

The control device may e.g. be an ECU (electronic control unit) of the vehicle.

The electronic control device may further be configured to activate the ambient light source using distinct predetermined lighting patterns for:
the output of a seat belt warning,
a received output of the blind spot monitor unit,
a received output of the rear cross traffic alert unit, and
a received output of the door open warning unit.

Accordingly, the electronic control device may signal different events to the passengers by using different lighting patterns. Such events may comprise not only the seat belt warning, but also a blind spot warning, a rear cross traffic alert (i.e. warning), and/or a door open warning.

The electronic control device may further be configured to use the distinct predetermined lighting patterns according to the following prioritization with (1) having the highest priority:
(1) a received output of the rear cross traffic alert unit,
(2) a received output of the blind spot monitor unit,
(3) a received output of the door open warning unit, and
(4) the output of a seat belt warning.

Accordingly, in case of a conflict, i.e. when more than one event occurs, the electronic device uses desirably the pattern of the event with the highest priority. Said priority may be (1) to (4).

In other words, in case any other event than the seat belt warning occurs at the same time, i.e. a blind spot warning, a rear cross traffic alert (i.e. warning), and/or a door open warning, the electronic device will desirably not output a seat belt warning but the other warning having the highest priority by using the respective lighting pattern.

The system may comprise at least one of:
a vehicle speed sensor,
a seat occupation detection sensor for at least one of the rear seats,
a seat belt buckle switch configured to detect the seat belt buckle status for at least one of the rear seat belts,
a blind spot monitor unit,
a rear cross traffic alert unit, and
a door open warning unit.

The present disclosure further relates to a vehicle comprising a system as described above.

The disclosure further relates to a method of checking a rear seat belt status in a vehicle having a passenger cabin with at least one rear seat. The method comprises the steps of:
checking whether the following conditions are fulfilled:
(1) at least one rear seats is occupied,
(2) the rear seat belt of the least one occupied rear seat is not buckled,
(3) (optionally) the vehicle is driving,
in case each of the conditions is fulfilled, outputting a seat belt warning by activating an ambient light source in the vehicle using a predetermined lighting pattern.

The method may comprise further method steps which correspond to the functions of the system, as described above.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
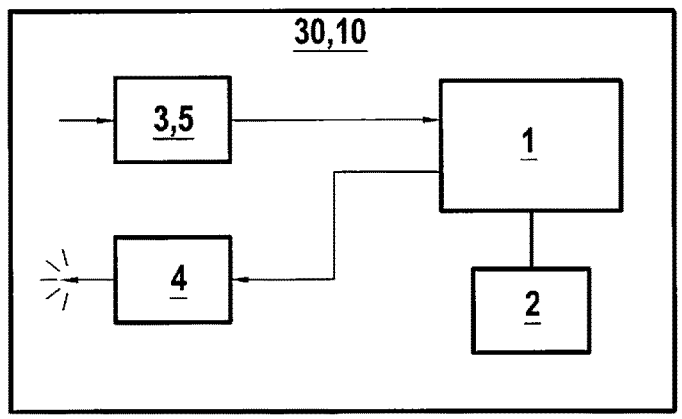
FIG. 1 shows a block diagram of a system with a control device according to embodiments of the present disclosure.

FIG. 1 shows a block diagram of a system 30 with a control device 1 according to embodiments of the present disclosure.

The control device 1 is connected to or comprises data storage 2. Said data storage may be used to store one or a plurality of predefined lighting patterns, as described in the following.

The control device 1 may additionally carry out further functions in the vehicle 10. For example, the control device may also act as the general purpose ECU (electronic control unit) of the vehicle. The control device 1 may comprise an electronic circuit, a processor (shared, dedicated, or group), a combinational logic circuit, a memory that executes one or more software programs, and/or other suitable components that provide the described functionality.

The control device 1 is further connected to at least one sensor 3, 5, in particular at least one seat occupation detection sensor 3 (e.g. measuring the weight of an objected placed on the seat) and/or at least one seat belt buckle status sensor 5 (e.g. a seat belt buckle switch).

The control device 1 is further connected to an ambient light source 4. The ambient light source 4 may also comprise an ambient light controller and one or a plurality of light sources, e.g. LEDs. The ambient light source 4 may be configured to generate a light according to a predetermined pattern defined by the electronic control device 1. The ambient light source 4 may comprise one or desirably several lighting elements (not shown). These elements may comprise desirably a plurality of LEDs. For example, the ambient light source 4 may comprise an ambient lighting ECU 4a and one or several light source elements 4b, 4c, as described in the following in context of FIG. 3.

Desirably the lighting elements are installed around the passengers, i.e. on the cabin walls, e.g. on the cabin doors below the door windows.

The control device 1, driver stimulation device 4 and the sensor 3 may be comprised by a vehicle 10. In other words, the system 30 may be part of the vehicle 10.

Figure 2:
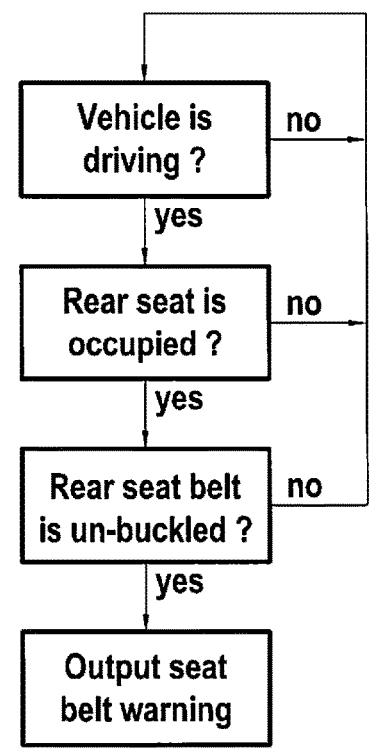
FIG. 2 shows a schematic flow chart illustrating an exemplary method of checking a rear seat belt status according to embodiments of the present disclosure.

FIG. 2 shows a schematic flow chart illustrating an exemplary method of checking a rear seat belt status according to embodiments of the present disclosure.

In optional step S1 it is checked whether the vehicle is driving (i.e. moving), in particular with a predetermined minimum speed.

If yes, the method continues with step S2. If not, the method may return to step S1. In step S2 it is checked whether at least one of the rear seats is occupied. For example, it can be checked by a weight sensor/pressure sensor integrated in the seat, whether a predetermined minimum weight is applied to said seat.

If yes, the method continues with step S3. If not, the method may return to step S1. In step S3 it is checked whether the rear seat belt of said occupied seat is buckled (i.e. fastened/closed).

Steps S1 to S3 may also have a different order than that one described, or they may be carried out simultaneously and/or in one single step.

If yes, the method continues with step S4. If not, the method may return to step S1. In step S4 a seat belt warning is output. This is done by outputting an ambient light having a predetermined lighting pattern.

Figure 3:
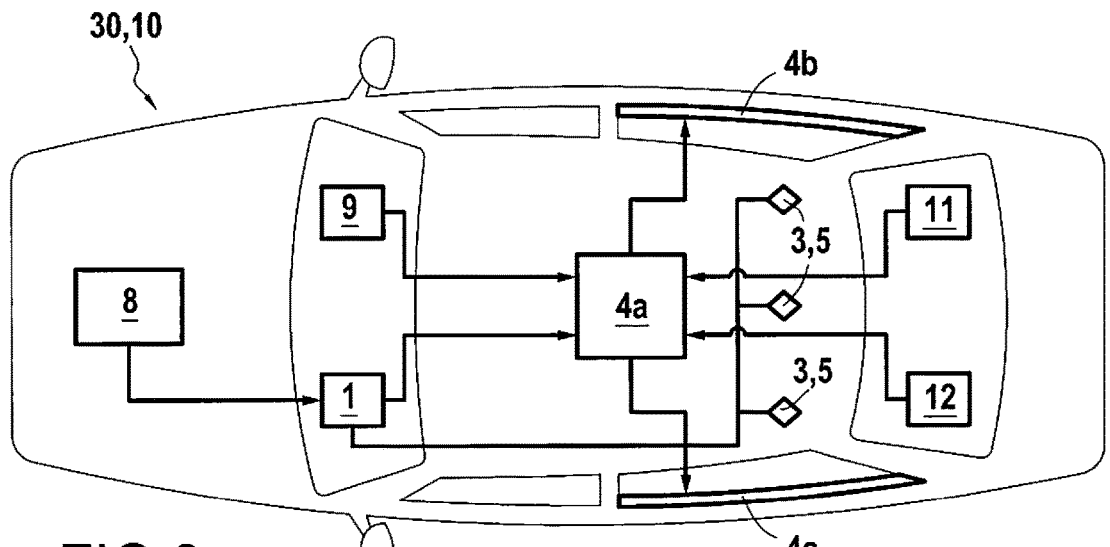
FIG. 3 shows a schematic representation of a vehicle comprising a system according to embodiments of the present disclosure.

FIG. 3 shows a schematic representation of a vehicle 10 (top side view with additional views of the inner sides of the left and right rear doors) comprising a system 30 according to embodiments of the present disclosure.

An electronic control device (e.g. main ECU) 1 is provided in the system and connected to occupation sensors 3 and buckle status sensors 5. For each of the (three) back seats there may be provided an occupation sensor 3 and a buckle status sensor 5. The electronic control device 1 may receive sensor outputs of the sensors 3, 5.

The electronic control device 1 is further connected to an ambient lighting ECU 4a. Said ambient lighting ECU 4a may control ambient light source elements 4b, 4c, which are e.g. LED bars or LED arrays positioned in the left and right rear door trims. The electronic control device 1 may send a seat belt warning request to the ambient lighting ECU 4a which then activates the light source elements 4b, 4c with a predetermined lighting pattern.

The electronic control device 1 may further be connected to a brake ECU (vehicle speed sensor) 8 which informs the electronic control device 1 (e.g. regularly) about the vehicle speed.

The electronic control device 1 and/or the ambient lighting ECU 4a may further be connected to a body ECU (door open warning unit) 9 which checks whether a door of the vehicle is open and outputs a door open warning request in case of an open door during driving, in particular to the ambient lighting ECU 4a.

The electronic control device 1 and/or the ambient lighting ECU 4a may further be connected to a BSM ECU (blind spot monitor unit) 11 which monitors blind spots of the vehicle and outputs a BSM warning request, e.g. in case of a detected object in the vehicle blind spot during driving, in particular to the ambient lighting ECU 4a.

The electronic control device 1 and/or the ambient lighting ECU 4a may further be connected to a RCTA ECU (rear cross traffic alert unit) 12 which checks rear cross traffic of the vehicle and outputs a RCTA warning request, e.g. in case of a detected rear cross traffic during driving, in particular to the ambient lighting ECU 4a.

In the following the operation of the electronic control device 1 and/or the ambient lighting ECU 4a is described in more detail according to different exemplary embodiments (i.e. the following functions described in context of electronic control device 1 may also be performed by the ambient lighting ECU 4a):

The electronic control device 1 receives the seat belt occupation status from seat occupation detection sensor 3. The electronic control device 1 receives the seat belt buckle switch status from the rear seat belt buckle sensors 5. The electronic control device 1 receives the vehicle speed from the brake ECU 8.

When below conditions are satisfied: (1) the vehicle speed is >1.75 km/h, (2) the seat on rear left side is occupied, and (3) the seat belt on the rear left side is unbuckled, then the electronic control device 1 desirably sends a request to the ambient lighting ECU 4a to turn on the rear left door ambient light source element 4c for seat belt warning.

When below conditions are satisfied: (1) the vehicle speed is >1.75 km/h, (2) the seat on right left side is occupied, and (3) the seat belt on the rear right side is unbuckled, then the electronic control device 1 desirably sends a request to the ambient lighting ECU 4a to turn on the rear right door ambient light source element 4b for seat belt warning.

When below conditions are satisfied: (1) the vehicle speed is >1.75 km/h, (2) the seat on rear center is occupied, and (3) the seat belt on the rear center is unbuckled, then the electronic control device 1 desirably sends a request to the ambient lighting ECU 4a to turn on the rear left and right door ambient light source elements 4b, 4c for seat belt warning.

The electronic control device 1 and/or the ambient lighting ECU 4a desirably applies below priority with 1 as highest priority:
(1) RCTA warning,
(2) BSM warning
(3) Door open warning
(4) Seat belt warning
(5) Ambient lighting (Normal operation).

When the electronic control device 1 sends a request to turn on the seat belt warning and no higher priority warning is active, the ambient lighting ECU 4a desirably turns on the ambient lighting element 4b, 4c with the respective lighting pattern, e.g. with a flashing at 0.5 Hz in red colour on the requested side for 90 seconds or until the seat belt warning is no longer requested or a higher priority warning is turned on.

The rear door ambient lighting element 4b 4c on rear left/right door desirably flashes at 0.5 Hz in RED when seat on the rear left/right or center is occupied with an unbuckled seatbelt.

When an RCTA warning, BSM warning and/or Door open warning is activated at the same time as the seat belt warning, the seat belt warning desirably stops immediately to be signalled by the ambient lighting element 4b 4c in the rear left/right door and is replaced by the respective warning with the highest priority.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A system for checking a rear seat belt status in a vehicle having a passenger cabin with at least one rear seat, the system comprising:
   an ambient light source configured to be arranged in the passenger cabin,
   an electronic control device configured to:
   check whether the following conditions are fulfilled:
   (1) at least one rear seat is occupied,
   (2) the rear seat belt of the at least one occupied rear seat is not buckled,
   in case each of the conditions is fulfilled, output a seat belt warning by activating the ambient light source using a predetermined lighting pattern,
   wherein the electronic control device is further configured to:
   receive an output of a blind spot monitor unit,
   receive an output of a rear cross traffic alert unit, and/or
   receive an output of a door open warning unit, and
   wherein the electronic control device is further configured to activate the ambient light source using distinct predetermined lighting patterns for:
   the output of a seat belt warning,
   a received output of a blind spot monitor unit,
   a received output of a rear cross traffic alert unit, and
   a received output of a door open warning unit.

2. The system according to claim 1, wherein
   the electronic control device is configured to check whether the further condition is fulfilled: (3) the vehicle is driving.

3. The system according to claim 2, wherein
   the condition whether the vehicle is driving comprises the condition whether the vehicle is driving with at least a predetermined minimum speed.

4. The system according to claim 1, wherein
   the condition whether at least one rear seat is occupied comprises the condition whether the at least one rear seat is occupied by an object having at least a predetermined minimum weight.

5. The system according to claim 1, wherein
   the ambient light source is configured to be arranged in the rear of the passenger cabin.

6. The system according to claim 1, wherein
   the ambient light source is configured to be arranged in the rear door trim of the left and/or right rear vehicle door.

7. The system according to claim 1, wherein
   the ambient light source is configured to be arranged such that the ambient light is visible to a driver of the vehicle.

8. The system according to claim 5, wherein
   the ambient light source is configured to be arranged such that the ambient light is visible to a driver of the vehicle.

9. The system according to claim 1, wherein
   the predetermined lighting pattern comprises flashing light with a predetermined frequency and/or a predetermined color.

10. The system according to claim 5, wherein
    the predetermined lighting pattern comprises flashing light with a predetermined frequency and/or a predetermined color.

11. The system according to claim 1, wherein
    the electronic control device is further configured to use the distinct predetermined lighting patterns according to the following prioritization with (1) having the highest priority:
    (1) a received output of the rear cross traffic alert unit,
    (2) a received output of the blind spot monitor unit,
    (3) a received output of the door open warning unit, and
    (4) the output of a seat belt warning.

12. The system according to claim 1, comprising at least one of:
    a vehicle speed sensor,
    a seat occupation detection sensor for at least one rear seat,
    a seat belt buckle switch configured to detect the seat belt buckle status for at least one rear seat belt,
    a blind spot monitor unit,
    a rear cross traffic alert unit,
    and a door open warning unit.

13. A vehicle comprising the system according to claim 1.

14. A method of checking a rear seat belt status in a vehicle having a passenger cabin with at least one rear seat, the method comprising the steps:
    checking whether the following conditions are fulfilled:
    (1) at least one rear seat is occupied,
    (2) the rear seat belt of the at least one occupied rear seat is not buckled, in case each of the conditions is fulfilled, outputting a seat belt warning by activating an ambient light source in the vehicle using a predetermined lighting pattern, wherein the method comprises a step that is further configured to:

receive an output of a blind spot monitor unit, receive an output of a rear cross traffic alert unit, and/or receive an output of a door open warning unit, and wherein the method further comprises a step of activating the ambient light source using distinct predetermined lighting patterns for:

the output of a seat belt warning, a received output of a blind spot monitor unit, a received output of a rear cross traffic alert unit, and a received output of a door open warning unit.

15. A system for checking a rear seat belt status in a vehicle having a passenger cabin with at least one rear seat, the system comprising:

an ambient light source configured to be arranged in the passenger cabin, an electronic control device configured to:

check whether the following conditions are fulfilled:

(1) at least one rear seat is occupied, (2) the rear seat belt of the at least one occupied rear seat is not buckled, in case each of the conditions is fulfilled, output a seat belt warning by activating the ambient light source using a predetermined lighting pattern, wherein the electronic control device is further configured to:

activate the ambient light source using distinct predetermined lighting patterns for:

the output of a seat belt warning, a received output of a blind spot monitor unit, a received output of a rear cross traffic alert unit, and a received output of a door open warning unit, use the distinct predetermined lighting patterns according to the following prioritization with (1) having the highest priority:

(1) a received output of the rear cross traffic alert unit, (2) a received output of the blind spot monitor unit, (3) a received output of the door open warning unit, or (4) the output of a seat belt warning.

* * * * *